US007861754B2

(12) United States Patent
Mitchell

(10) Patent No.: US 7,861,754 B2
(45) Date of Patent: Jan. 4, 2011

(54) EDGER WITH STAGGERED SAWS

(75) Inventor: Rory M. Mitchell, Beaverton, OR (US)

(73) Assignee: USNR/Kockums Cancar Company, Vancouver, WA (US)

( * ) Notice: Subject to any disclaimer, the term of this patent is extended or adjusted under 35 U.S.C. 154(b) by 189 days.

(21) Appl. No.: 12/142,603

(22) Filed: Jun. 19, 2008

(65) Prior Publication Data

US 2008/0314478 A1 Dec. 25, 2008

Related U.S. Application Data

(60) Provisional application No. 60/929,256, filed on Jun. 19, 2007.

(51) Int. Cl.
*B23Q 15/00* (2006.01)
*B26D 5/00* (2006.01)

(52) U.S. Cl. ........................ 144/382; 144/2.1; 144/218; 144/237; 83/75.5; 83/76.6; 83/425.3; 83/425.4; 83/508.3

(58) Field of Classification Search ................. 144/382, 144/392, 394, 402, 404, 237, 239, 218, 2.1, 144/3.1; 83/75.5, 76.6, 76.7, 76.8, 508.1–508.3, 83/425.2–425.4, 471.1
See application file for complete search history.

(56) References Cited

U.S. PATENT DOCUMENTS 3,347,289 A * 10/1967 Zizka et al. .................. 83/876
3,645,304 A * 2/1972 Thrasher ...................... 83/821
4,239,072 A 12/1980 Merilainen
4,449,557 A 5/1984 Makela et al.
5,761,979 A * 6/1998 McGehee .................. 83/425.3
5,870,936 A * 2/1999 McGehee ...................... 83/13
6,062,281 A * 5/2000 Dockter et al. .............. 144/357
6,612,216 B2 * 9/2003 McGehee et al. .......... 83/425.4
6,705,363 B2 * 3/2004 McGehee et al. ........... 144/357
6,877,411 B2 * 4/2005 McGehee et al. .......... 83/425.4
6,988,438 B2 * 1/2006 McGehee et al. .......... 83/425.4
7,013,779 B2 * 3/2006 McGehee et al. .......... 83/425.4

* cited by examiner

*Primary Examiner*—Shelley Self
(74) *Attorney, Agent, or Firm*—Schwabe, Williamson & Wyatt

(57) ABSTRACT

Embodiments of the present invention provide a wood processing machine adapted to cut wood workpieces along multiple optimized cutting paths. In various embodiments, the wood processing machine includes a first saw assembly and a second saw assembly that is disposed down stream from the first saw assembly. The first saw assembly is adapted to cut the workpiece along the first optimized cutting path and the second saw assembly is adapted to cut the workpiece along the second optimized cutting path.

8 Claims, 12 Drawing Sheets

EDGER WITH STAGGERED SAWS

CROSS REFERENCE TO RELATED APPLICATIONS

The present application is related to U.S. Patent Application No. 60/929,256, filed Jun. 19, 2007, entitled "EDGER WITH STAGGERED SAWS," the entire disclosure of which is hereby incorporated by reference in its entirety.

TECHNICAL FIELD

Embodiments of the present invention relate to a method and an apparatus for edging workpieces such as flitches, and, more specifically, to a pair of staggered active sawguide packages which are constantly adjusted to corresponding target lines during sawing, for edging workpieces according to an optimized profile.

BACKGROUND

Increasingly, many parts of the world are growing plantation forest of Radiata Pine, Eucalyptus and other fast growing species. One of the problems with these trees and other species is that the heartwood has poor strength characteristics and is unsuitable for structural grade timber. Consequently, it is used for non-structural purposes such as pallet stock where its value is roughly one third that of structural lumber. Structural lumber is made from the outside, or sapwood of the tree. Accordingly, any structural lumber cut from flitches of these varieties, or having other heartwood deficiencies, is required to be cut by avoiding the heartwood while edge trimming the flitch. Previous edge trimmers, typically known as edgers, have not adequately addressed this difficulty.

For example, U.S. Pat. No. 4,239,072 discloses a method and apparatus for edge trimming a flitch. A number of overhead pres rolls engage the flitch as the flitch passes along a chain conveyor. The flitch is centered by sets of centering rolls. A number of scanners are positioned above the conveyor to provide a computer with appropriate information on the profile of the flitch. The edging assembly includes a pair of adjustable cutting heads designed to chip the unwanted edges from the side board. The cutting heads are dewed in a direction perpendicular to the direction of movement of the board by hydraulic cylinders so that one or more pieces of side board lumber can be cut from a single flitch.

U.S. Pat. No. 4,449,557, assigned to the same assignee as U.S. Pat. No. 4,239,072, uses substantially the same system for delivering flitches to an edging assembly as the '072 patent. However, instead of using angled edge chippers, as in the '072 patent, the '557 patent uses sawing disks or saw blades to make the edge cuts. The entire edger system moves as a unit so that the sawing disks can skew, that is change the angle between the axis of rotation of the sawing disks and the axis of rotation of the arbor on which the saw blades are mounted, and can slew, that is move laterally along a line generally parallel to the axis of rotation of the arbor.

Many conventional edger optimizer systems measure the boards transversely and then position the flitch onto a feeding mechanism and move the flitch longitudinally into the edger. This conventional method requires a considerable amount of expensive scanning, positioning and transporting equipment to carry out the process. Conventional systems also commonly create cumulative scanning, positioning and transport errors that make the systems somewhat less than optimal. With regard to the '557 patent, complex board centering mechanisms, multiple scanner heads, complex and high maintenance feeding and tracking devices, and complex high inertia edger rotation devices are all characteristic of the system described in the patent.

U.S. Pat. Nos. 5,761,979 and 5,870,936 to McGehee and incorporated herein by reference, disclose using a saw guide or saw guides where sawguides and saws are actively translated along a fixed driven arbor. The sawguides and saws may be skewed a few degrees on either side of the perpendicular to the arbor axis, so that the saws either actively traverse a non-symmetrical flitch fed into the saws lineally for optimum board edging, or actively follow a curved path for sawing boards from a cant fed into the saws lineally, from optimized data of the scanned profile. This system permits curve sawing without requiring the movement of the entire saw box.

U.S. Pat. No. 7,013,779 to McGehee et al and is incorporated herein by reference, discloses a sawguide and saw assembly that includes a plurality of sets of sawguides operating on corresponding saws mounted on a common saw arbor, wherein the sawguides within each set positioned adjacent to one another to create an array of laterally-abutting sawguides. Corresponding sawguide biasing assembly's bias the sawguides in each set against one another. The arrays are supported for independent movement along a lateral path generally parallel to the axis of the arbor. Lateral drivers are used to move each array in unison along the lateral path but independent of the other arrays. A sawguide array skewing assembly couples the sawguides of each array to one another so that the sawguides can be pivoted in unison about their respective pivot axes by a corresponding skewing driver.

In addition, many conventional curve edging systems are limited in terms of the width of boards that may be cut from a flitch. Such boards are limited by the width of the narrowest portion of the flitch. As the edging saws approach the narrowest portion of the flitch, their mounting on a common arbor prevents any ability to overlap the saw blades. Accordingly the cumulative width of boards cut from a flitch must be less than the narrowest portion of the flitch. However, it will be appreciated that these board widths may not correspond to the maximum widths available to be cut form a flitch based upon the usable sapwood of the flitch.

SUMMARY OF THE INVENTION

Thus the prior art teaches trapezoidal sawing of cants or flitches to recover higher quality lumber from sap wood while avoiding the lower quality pith wood. This deals with species that can be subject to heart rot (cedar) and/or high taper (northern and eastern Canadian logs) where it would be advantageous to either follow one or both edges to recover the better quality outside wood and avoid the centre of a flitch.

The present invention changes conventional linear edging to improve recovery and/or value where a two board sawing solution overlaps in a single workpiece by staggering two active edgers so that one is immediately downstream of the other. That is, the solutions may be made to overlap to further enhance the recovery from defective flitches.

Thus, the present invention may be characterized in one aspect as directed to such a pair of staggered active edgers where each has an active sawguide assembly used to position saws along a corresponding arbor to permit optimized edging without the need to move the entire saw box.

By providing two staggered sets of edging saws with two corresponding separately controlled arrays of saws capable of independently following a different optimized path, cutting sapwood from fast growing species may be optimized using an overlapping two board cutting solution so as to recover a board from each side of a flitch to avoid inclusion of heartwood and thereby achieve the most recovery of structural grade wood.

According to a first embodiment of the present invention there is disclosed an active sawguide and arbor assembly. The active sawguide and arbor assembly comprises a pair of arbors mounted staggered with a first arbor of the pair upstream of a second arbor of the pair along a workpiece flow path. The pair of arbors slidably support and driveably engage a plurality of saws along each arbor. The active sawguide and arbor assembly further comprises a plurality of sawguides mounted in cooperation with the pair of arbors and corresponding to the plurality of saws for supporting the edges of the saws in the corresponding sawguides of the plurality of sawguides. A first array of sawguides are mounted in cooperation with the first arbor and a second array of sawguides are mounted in cooperation with the second arbor. Each corresponding sawguide in the first array is actively positionable and skewable by first actuating means relative to a fixed frame of reference for actively positioning and skewing the corresponding saws on the first arbor according to an optimized cutting solution for a first work product to be sawn from the workpiece. Each of the corresponding sawguides in the second array is actively positionable and skewable by a second actuating means relative to the fixed frame of reference for actively positioning and skewing the corresponding saws on the second arbor according to an optimized cutting solution for a second work product to be sawn from the workpiece.

The first actuating means may include a positioning actuator corresponding to each sawguide and a first skewing actuator for skewing the first array of sawguides to a first angle wherein the second actuating means may include a positioning actuator corresponding to each sawguide and a second skewing actuator for skewing the second array of sawguides to a second angle. The first skewing actuator may simultaneously skew the first array of sawguides and the second skewing actuator may simultaneously skew the second array of sawguides. The first skewing actuator may skew each sawguide in the first array to a first angle wherein the second skewing actuator skews each sawguide in the second array to a second angle. A first skewing drive shaft may be operably connected to each sawguide in the first array wherein the first skewing drive shaft is rotated by the first skewing actuator. A second skewing drive shaft may be operably connected to each sawguide in the second array wherein the second skewing drive shaft is rotated by the second skewing actuator.

According to a further embodiment of the present invention there is disclosed an active sawguide and arbor assembly. The active sawguide and arbor assembly comprises a pair of arbors mounted staggered with a first arbor of the pair upstream of a second arbor of the pair along a workpiece flow path. The pair of arbors slidably support and driveably engage a plurality of saws along each arbor. The active sawguide and arbor assembly further comprises a plurality of sawguides mounted in cooperation with the pair of arbors and corresponding to the plurality of saws for supporting edges of the saws in the corresponding sawguides of the plurality of sawguides wherein a first array of sawguides are mounted in cooperation with the first arbor and a second array of sawguides are mounted in cooperation with the second arbor. The active sawguide and arbor assembly further comprises a positioning actuator corresponding to each of the plurality of sawguides, a first skewing actuator for skewing the first array of sawguides, and a second skewing actuator for skewing the second array of sawguides. The positioning actuators and the first skewing actuator cooperate to actively position and skew the first array of sawguides on the first arbor according to an optimized cutting solution for a first work product to be sawn from the workpiece. The positioning actuators and the second skewing actuator cooperate to actively position and skew the second array of sawguides on the second arbor according to an optimized cutting solution for a second work product to be sawn from the workpiece.

According to a further embodiment of the present invention there is disclosed a method of actively sawing a workpiece. The method comprises providing a pair of sets of saws staggered with a first set of saws of the pair upstream of a second set of saws of the pair along a workpiece flow path, each of the sets of saws being skewable to a common angle and independently skewable. The method further comprises actively skewing and slewing the first set of saws to cut at least a first board from the workpiece; and actively skewing and slewing the second set of saws to cut at least a second board from the workpiece.

BRIEF DESCRIPTION OF THE DRAWINGS

Embodiments of the present invention will be readily understood by the following detailed description in conjunction with the accompanying drawings. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof, and in which are shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Figure 2:
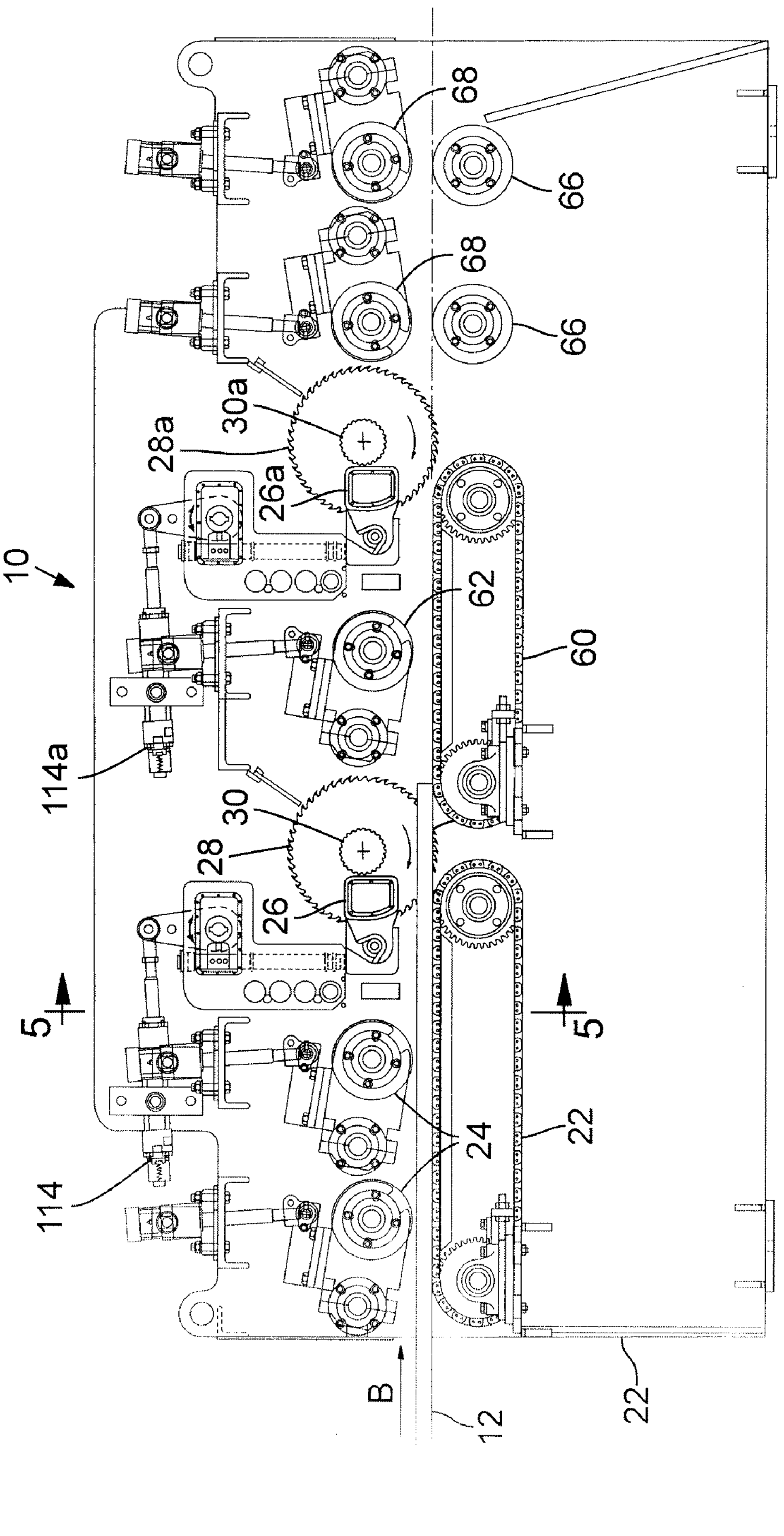
FIG. 2 illustrates an enlarged view, taken along section line 2-2 in FIG. 1 of the active sawguide system of the present invention within the sawbox for use to practice various embodiments of the present invention.

In the following detailed description, reference is made to the active sawguide and arbor assembly of the present invention is generally indicated by the reference numeral 10. A workpiece 12 is fed transversely from the mill in direction A and is directed onto a lineal transfer 6 and positioned against a fixed fence 7 or other positioning means, for roughly or approximately centering the workpiece on the lineal transfer. Once workpiece 12 is roughly centered on lineal transfer 6 it is translated lineally in direction B through a lineal scanner 8 towards sawbox 20. Scanner 8 scans workpiece 12. Once through the scanner workpiece 12 is translated onto an infeed sharp chain transfer 22 positioned within the infeed area of sawbox 20. As best seen in FIG. 2 a plurality of overhead driven press rolls 24 are located above infeed sharp chain transfer 22. Press rolls 24 press down on workpiece 12 to feed workpiece 12 straight into sawbox 20 in direction B. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Figure 1:
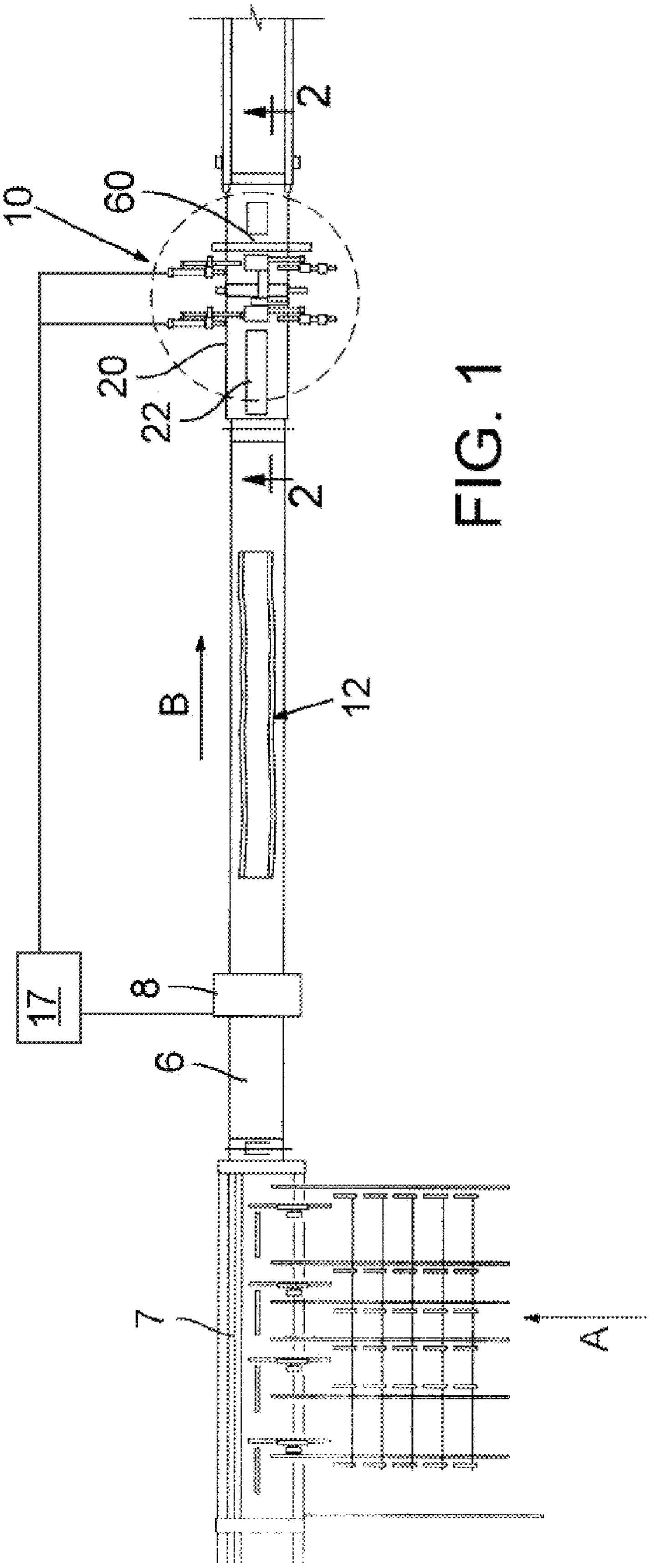
FIG. 1 illustrates a plan view showing the sawing system of the present invention in accordance with various embodiments of the present invention.

The embodiment of FIG. 1 shows a linear scan system. There are other ways to scan, optimize and present a workpiece to the saws. Another way is to scan the workpiece transversely, position it on a positioning feed table and then feed it towards the sawbox. Yet another way is to mechanically centre the workpiece on a chain that feeds workpieces to the sawbox where the workpiece is scanned on this chain as it proceeds to the sawbox.

The outfeed area of sawbox 20 also has a sharp chain transfer bed 60 cooperating with a plurality of outfeed overhead press rolls 62. Press rolls 24 press workpiece 12 onto lower infeed sharp chain 24. Press rolls 24 and 62 provide for continued straight feeding of workpiece 12 through sawbox 20. Note, however, workpiece 12 could be fed through sawbox 20 along a curved or partially curved path.

Figure 3:
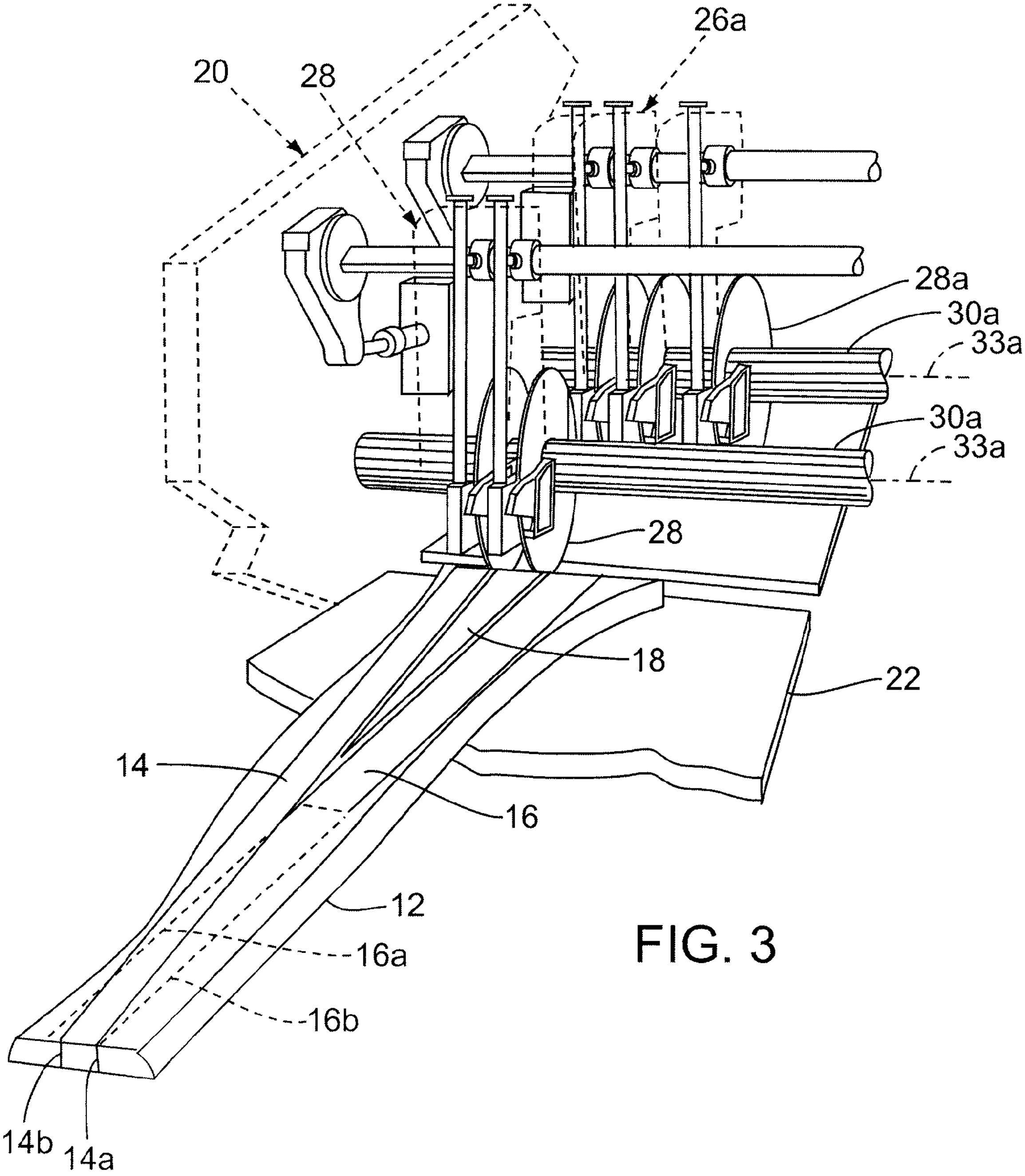
FIG. 3 illustrates an isometric view showing the active sawguide assembly of the present invention in accordance with various embodiments of the present invention.
Figure 4:
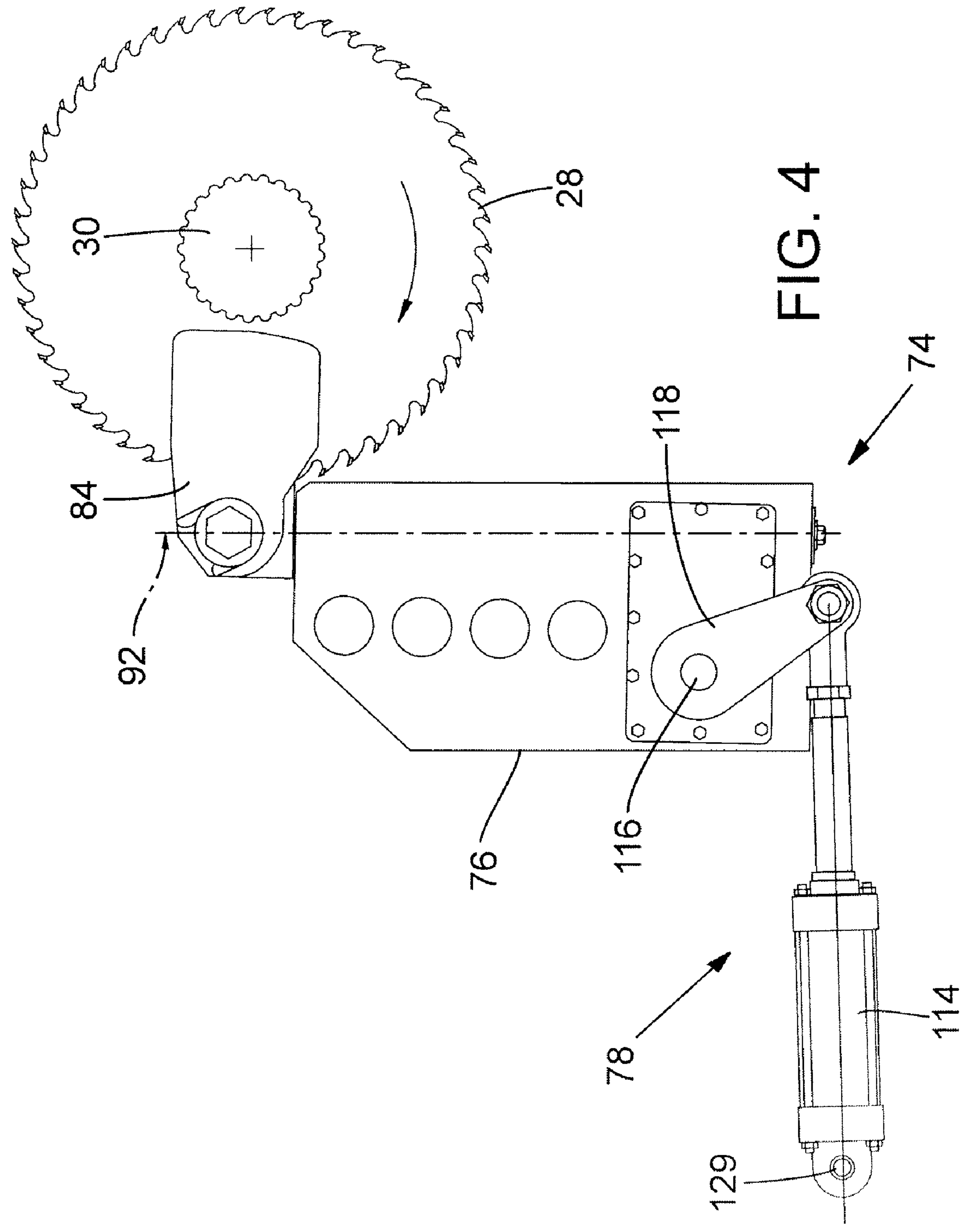
FIG. 4 illustrates an enlarged side view of one of the active sawguide assemblies of the present invention in accordance with various embodiments of the present invention.
Figure 5:
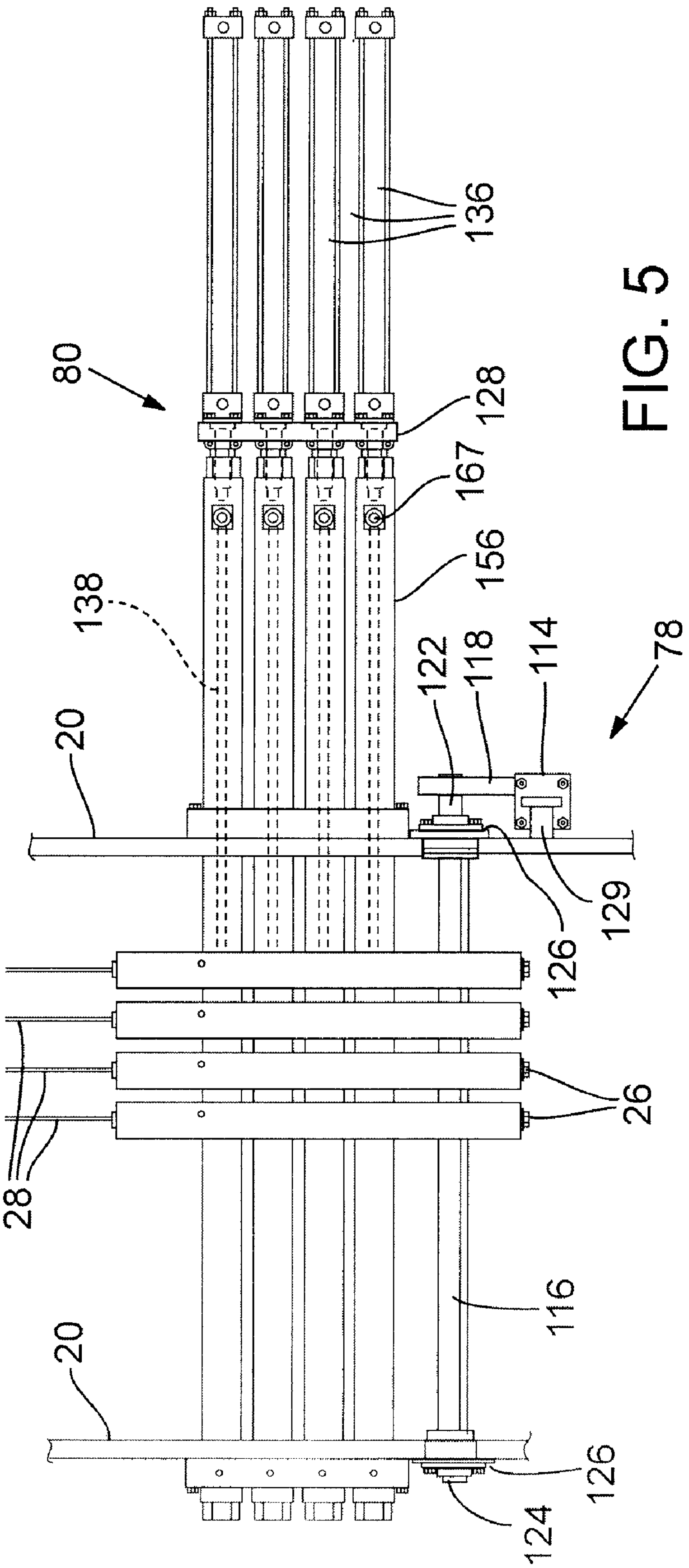
FIG. 5 illustrates an end view of the saw assembly of FIG. 4 (without the arbor but showing portions of a support frame) showing a set of four saw blade positioner assemblies and associated saw blades at a first set of locations along the arbors and at a zero skew angle in accordance with various embodiments of the present invention.
Figure 6:
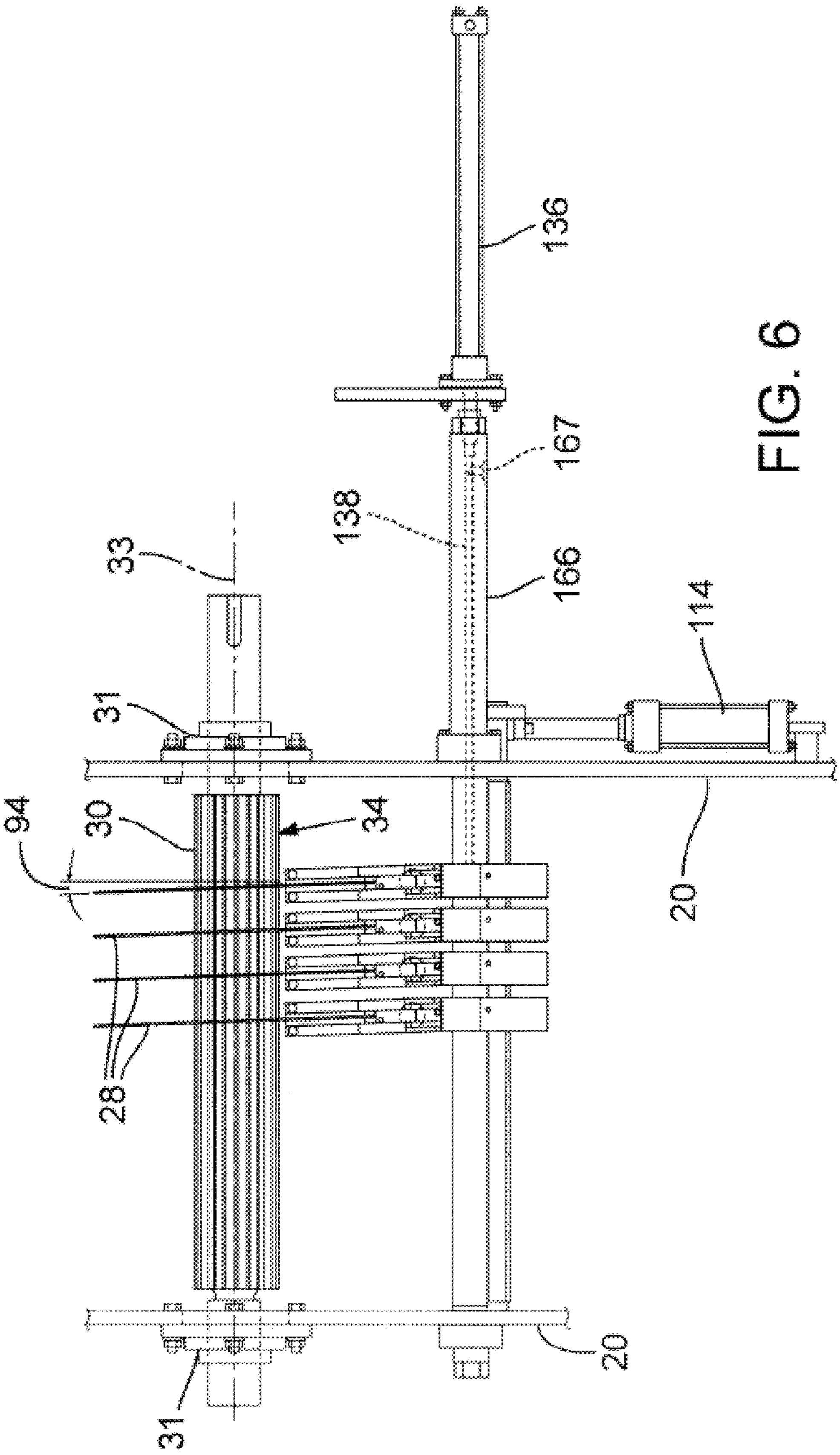
FIG. 6 illustrates a top view of the saw assembly of FIG. 4 with the arbor showing a set of four saw blade positioner assemblies and associated saw blades at a first set of locations along the arbor and at a two degree skew angle in accordance with various embodiments of the present invention.

As best seen in FIGS. 2 and 3, active first and second sets of sawguide assemblies 26 and 26*a* respectively, are mounted within sawbox 20. Each of the active sawguide assemblies 26 and 26*a* guides a plurality of circular saws 28 and 28*a*, respectively mounted in parallel array on splined arbors 30 and 30*a*. Arbors 30 and 30*a* are supported by sawbox 20 through bearings for rotation about saw axes 33 and 33*a* (see e.g., FIG. 6 showing arbor 30 supported by sawbox 20 through bearings 31). Arbors 30 and 30*a* are longitudinally spaced apart in the direction of flow of the workpiece 12 by a distance of at least thirty inches although it will be appreciated that longer distances may also be useful. Saws 28 and 28*a* are held snugly between pairs of sawguides and are slidably mounted onto the arbor so as to be free to translate, that is slide, laterally on the arbor relative to each other as well as the sawbox 20 as further described below. Active movement, as better described below, of sawguide assemblies 26 and 26*a* actively moves the saws so that an optimized sawing path through workpiece 12 may be followed, thereby producing improved lumber recovery. The optimized sawing path is determined by an optimizing processor (not shown) processing data from the scanned image of workpiece 12. The active sawguide assemblies 26 and 26*a* and saw arbors 30 and 30*a* may be suspended above a workpiece as illustrated in FIGS. 2 and 3 or supported below a workpiece as illustrated in FIGS. 4 to 13.

FIGS. 4-12 illustrate a sawguide assembly 74 with a corresponding saw 28 and arbor 30 separate from the sawbox 20. Although one of the first sawguide assemblies 74 is illustrated in FIGS. 4-12, it will be appreciated that the structure and function described and illustrated for a first sawguide assembly 74 will also apply to one of the second sawguide assemblies 26*a* as well. The active sawguide assembly 74 includes two or more saw blade positioners 76 (four in the preferred embodiment) plus a skewing assembly 78 and a slewing assembly 80 (shown best in FIG. 5).

FIGS. 7-11 illustrate sawguide assembly 74 in conjunction with a saw blade 28. Saw blade positioner 76 includes a positioner body 82 which supports a pair of guide arms 84. Guide arms 84 each have a low friction pad 86, typically made of babbitt, positioned to engage the annular side surfaces 29 of saw blade 28. Guide arms 84 locate each saw blade 28 along the arbor axis 33. Also, since guide arms 84 are pivotal about a generally vertical pivot axis 92 passing through positioner body 82, guide arms 84 also determine whether the axis of rotation of each saw blade 28 is collinear with arbor axis 90 or if it is offset or skewed by a skewing angle, such as from 0 degrees to five degrees, two degrees being a typical maximum skew angle. A two degree skewing angle 94 is illustrated in FIG. 6.

Figure 7:
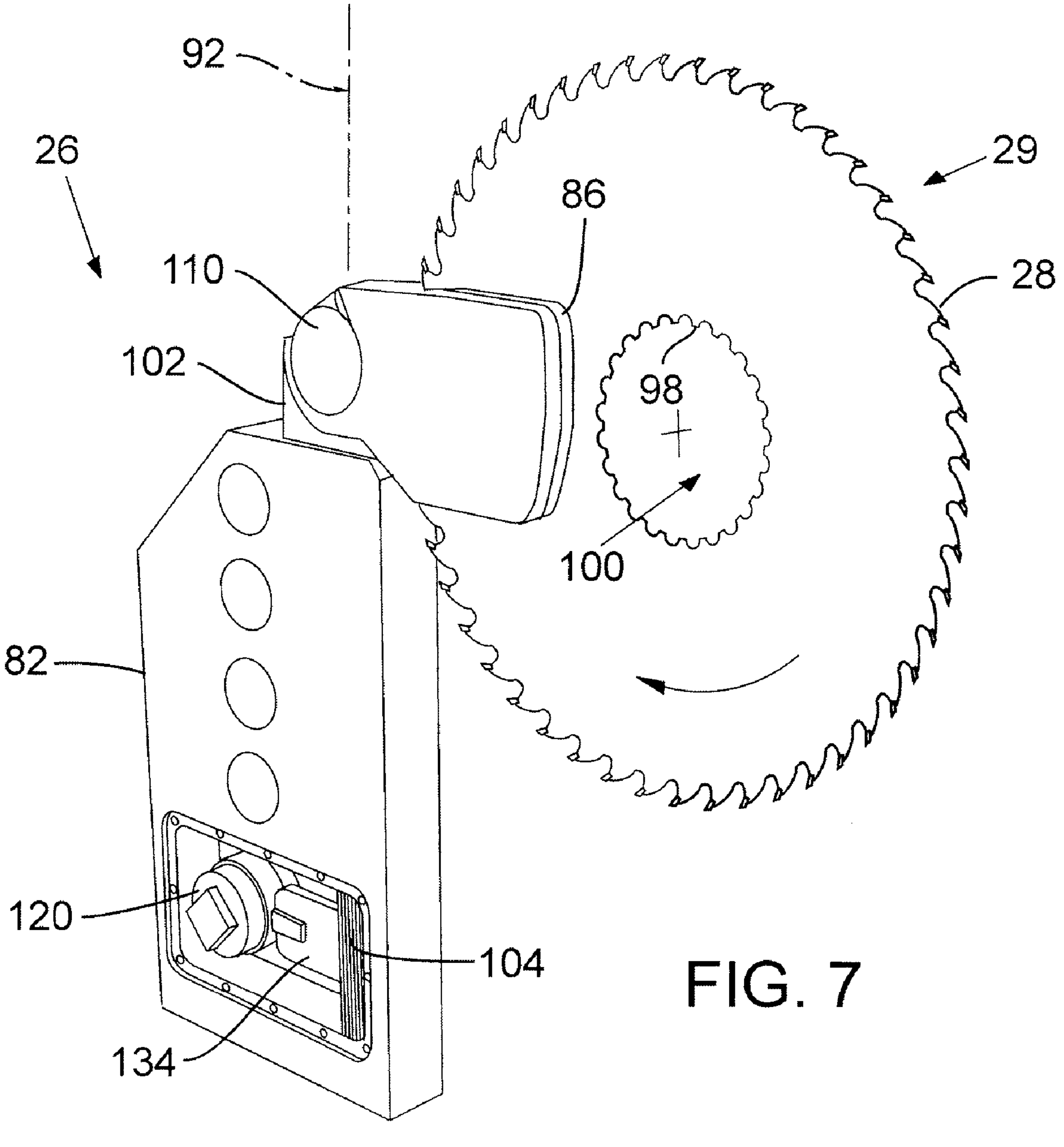
FIG. 7 illustrates an enlarged isometric view of the saw blade positioner of FIG. 4 together with a saw blade in accordance with various embodiments of the present invention.
Figure 8:
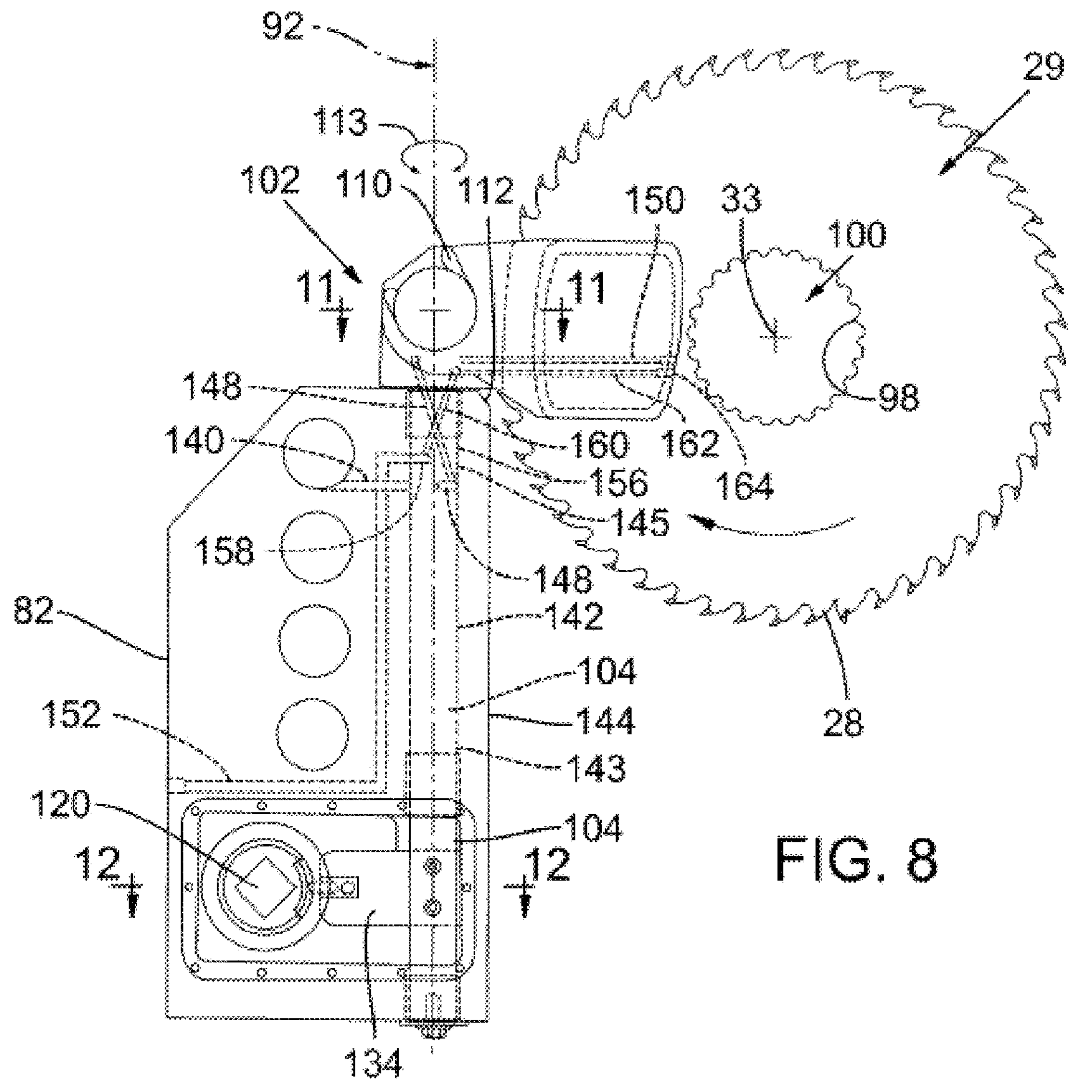
FIG. 8 illustrates a side view of the saw blade positioner and saw blade of FIG. 7 in accordance with various embodiments of the present invention.
Figure 9:
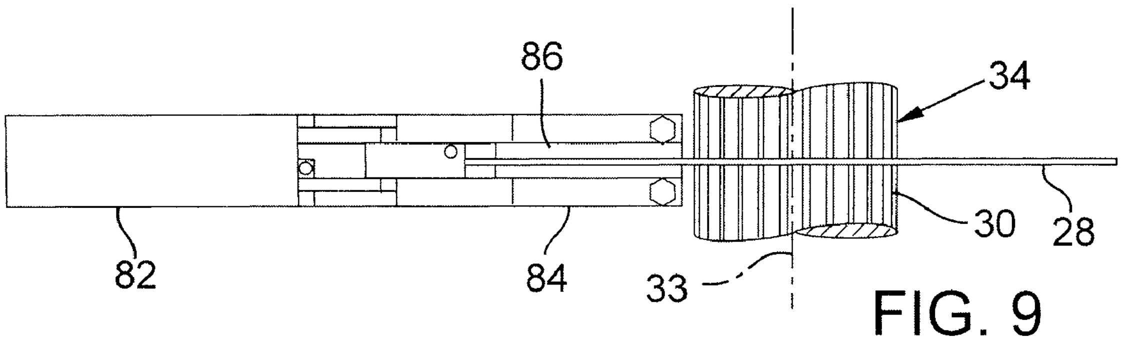
FIG. 9 illustrates a top view of the saw blade positioner and saw blade of FIG. 7 together with an arbor in accordance with various embodiments of the present invention.
Figure 10:
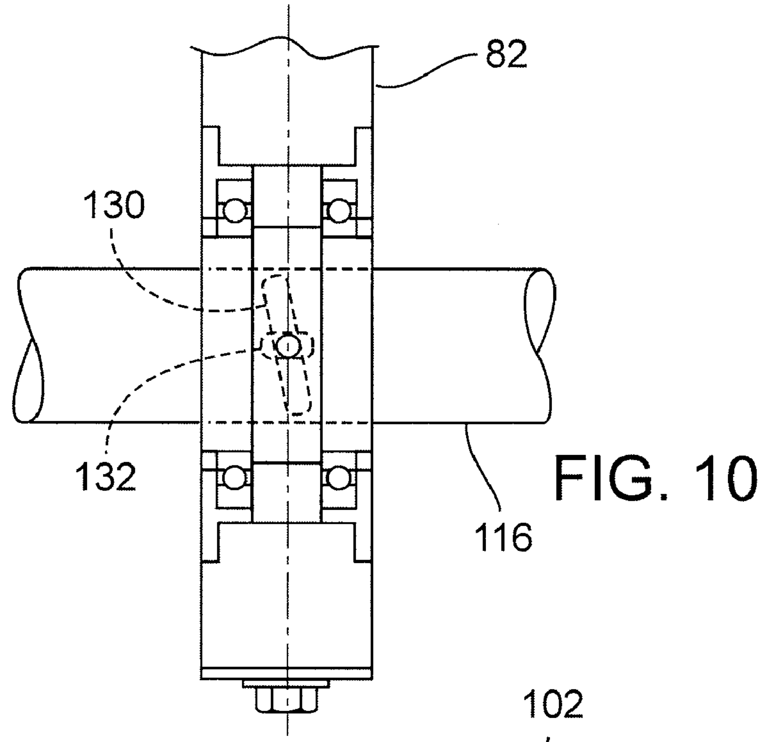
FIG. 10 illustrates an end view of the saw blade positioner of FIG. 7 in accordance with various embodiments of the present invention.
Figure 11:
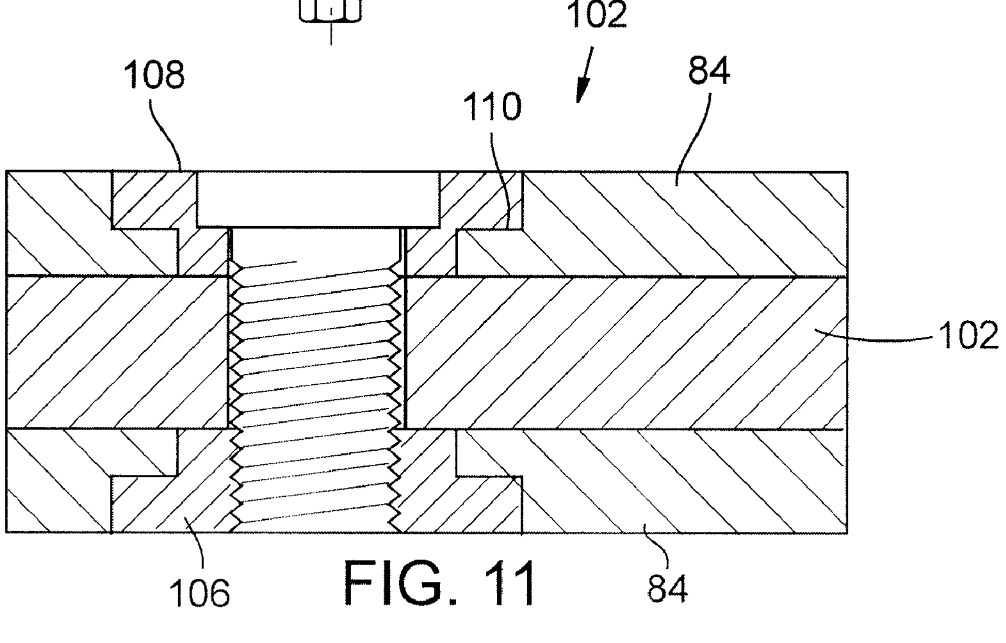
FIG. 11 illustrates a somewhat simplified cross-sectional view taken along line 11-11 in FIG. 8 in accordance with various embodiments of the present invention.

As seen in FIG. 7, the outer drive surface 34 of arbor 30 is scalloped as is the corresponding inner surface 98 of saw blade 75 defining eye 100. The diameter of surface 98 is greater than the corresponding diameter of surface 34 by an amount sufficiently small to permit a good driving interface between surfaces 34, 98 but sufficiently large to permit the desired range of skewing angles to be used. Conventional saws have an eye which is about 0.008 to 0.010 inch (0.20 to 0.25 mm) larger in diameter than the arbors to which they are mounted, assuming a nominal arbor diameter of about 6 inches (15 cm). Increasing this difference in diametric dimensions to about 0.020 inch (0.51 mm) is sufficient. Also, the inner surfaces of conventional saw blades are square cut since they are typically intended to have a zero skew angle. However, with the present invention, inner surface 98 may be rounded to eliminate an edge or corner of surface 98 from engaging drive surface 34 of arbor 30.

Figure 12:
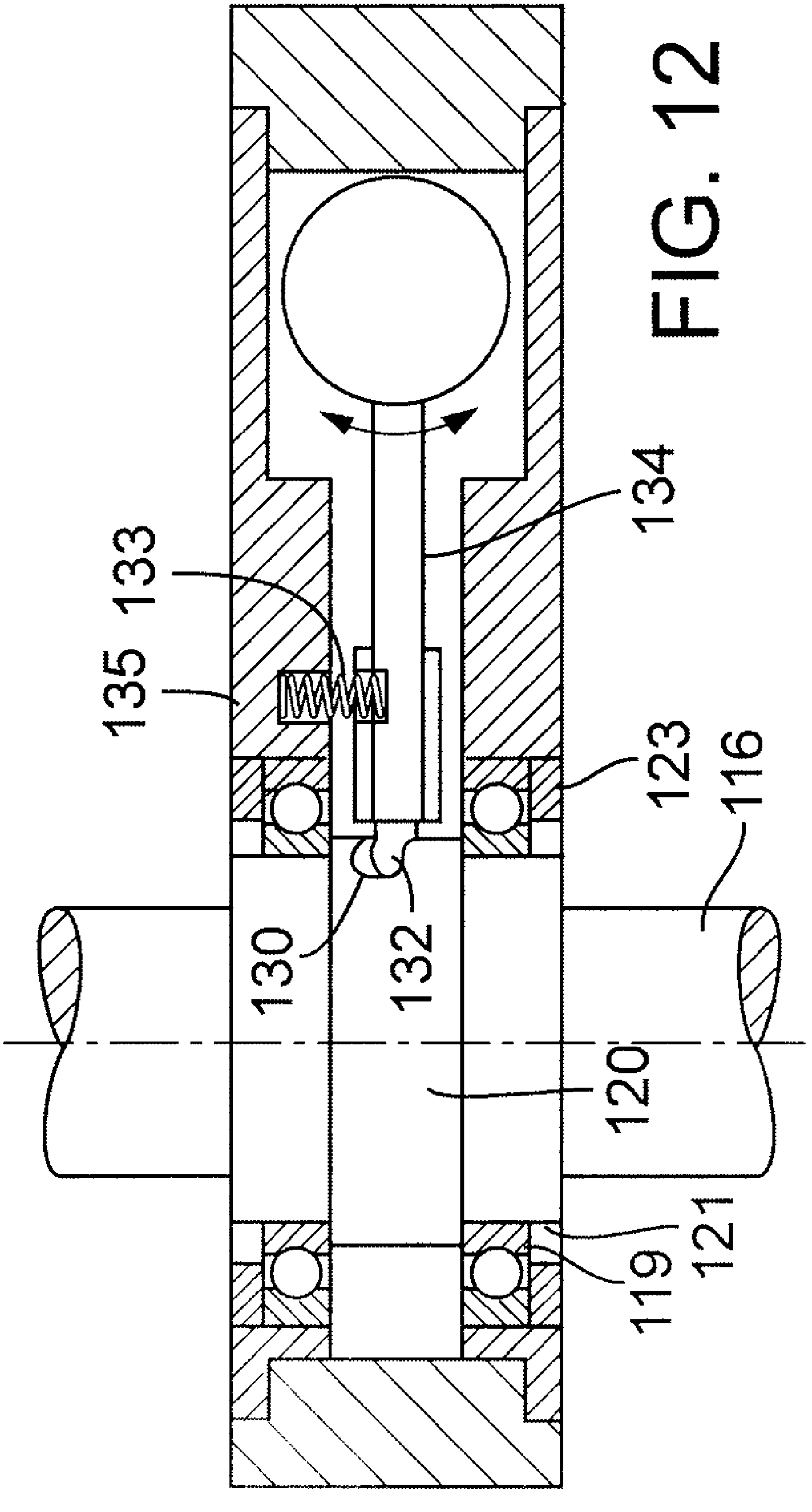
FIG. 12 illustrates an enlarged cross-sectional view taken along line 12-12 in FIG. 8 in accordance with various embodiments of the present invention.

Guide arms 84 are supported by positioner body 82 through a coupler 102 at the upper end of a pivot shaft 104. Coupler 102 includes a pair of spools 106, 108 which engage U-shaped ledges 110 formed at the inner ends of guide arms 84. In their normal operating positions, such as shown in FIG. 12, guide arms 84 rest against a chambered corner 112 of coupler 102 and are secured in place by tightening spools 106, 108. Guide arms 84 can be swung out of the way, that is pivoted in the direction of arrow 113 of FIG. 8, by loosening spools 106, 108 and pivoting the guide arms about 90 to 120 degrees. This permits free access to both guide arms 84, such as to replace pads 86, or saw blades 75.

Pivot shaft 104 is rotated about its vertical pivot axis 92 by the actuation of a skewing cylinder 114. Skewing cylinder 114 is coupled to a skewing drive shaft 116 through a crank arm 118. Drive shaft 116 has a square cross-sectional shape and passes through a complementary opening in a rotary cam 120. Rotary cam 120 is secured within body 82 by the inner races 119 of a pair of bearings 121. See FIG. 12. Bearings 121 are secured in place by a pair of alignment nuts 123 threadably secured to body 82.

The ends 122, 124 of skewing drive shaft 116 are supported by bearings 126 mounted to the sawbox 20. Sawbox 20 also supports one end 129 of skewing cylinder 114, the ends of arbor 30 and an electric motor (not shown) which drives arbor 30.

Rotary cam 120 has an angled slot 130 around a part of its periphery within which a pin 132 extending from a paddle 134 engages. Paddle 134 is a rigid extension of pivot shaft 104 so that as rotary cam 120 is rotated through the rotation of skewing drive shaft 116, pin 132 passes along slot 130 and in doing so pivots about axis 92. Thus, paddle 134 and pivot shaft 104 both pivot together about pivot shaft 92 according to the rotational motion of skewing drive shaft 116. A spring 133, captured between a set screw 135 and paddle 134, keeps pin 132 pressing against one side of slot 130. This keeps pin 132 from moving laterally within the slot thus keeping the skewing angle of saw blade 28 stable during use. Since the same skewing drive shaft 116 engages each saw blade positioner 76, each saw blade 28 is skewed in unison by its respective guide arms 84 as the guide arms rotate about axis 92.

Slewing assembly 80 is used to position each saw blade positioner 76 and saw blade 28 therewith along arbor axis 33. Slewing assembly 80 includes a shift shaft 166 and an axial locating and slewing linear actuator 136 for each saw blade positioner 76. Typically the spacing between each saw blade 28 is determined prior to workpiece 12 being cut by saw blades 28. However, during the sawing process, saw blades 28 can be slewed, that is moved, along surface 34 of arbor 30 parallel to arbor axis 38 by the simultaneous actuation of each slewing actuator 136. As can be seen in FIGS. 5 and 6, actuators 136 are supported along their lengths by sawbox 20.

To reduce friction and thus minimize wear and reduce heat buildup between pads 86 and surfaces 29 of saw blades 28, a liquid, such as water, is applied to surface 29.

Each shift shaft 166 is coupled to a supply of lubricating liquid, typically some sort of oil, through a liquid port 167 and has a channel 138 (see FIGS. 5 and 6) along its length fluidly coupled to a corresponding passageway 140 (see FIG. 8) within the positioner body to which it is secured. Passageway 140 connects passageway 138 to an annular gap 142 formed between the outside surface of pivot shaft 104 and the generally cylindrical bore 144 formed in positioner body 82. This permits fluid flow through passageway 140, into annular gap 142 between O-rings 143, 145 and into a radial bore 146 formed in pivot shaft 104. Radial bore 146 is coupled to a connecting bore 148 which extends up into coupler 102. Connecting bore 148 is coupled to a final bore 150 formed in each guide arm 84. Each final bore 150 opens inwardly towards surface 29 to permit the liquid to be applied to surfaces 29, especially in the vicinity of pads 86.

In addition to cooling and providing some lubrication between pad 86 and surface 29, it is desired to lubricate the interface between inner surface 98 of saw blade 28 and outer drive surface 34 of arbor 30. This is achieved by connecting a lubricating bore 152 formed in each positioning body 82 with bore 152 and enters annular gap 142 at a position between O-ring 145 and an O-ring 156. Lubricant is directed from passageway 152 into gap 142 and then into a radial passageway 158 in pivot shaft 104 and an upwardly extending passageway 160. Passageway 160, like passageway 148, connects to a final bore 162 formed in each guide arm 84. The outer end 164 of each final bore 162 is directed at arbor 30 thus providing a fine, controlled spray of lubricant to the arbor at its interface with inner surface 98 of saw blade 28.

Arbor 30 may have an outer drive surface 34 which is other than scalloped, such as octagonal or oval. While surfaces 34 and 98 are preferably generally complementary surfaces, they are not necessarily truly complementary.

In use, workpieces 12, which can be side boards, flitches, timber or lumber, are directed onto linear transfer 14 which move each workpiece 12 in direction B towards scanner 8. Once workpiece 12 begins to pass under scanner 8, it has obtained a stable position on scanning conveyor 44. The profile for workpiece 12 is provided to a controller and optimizer processor 17 (FIG. 1) which computes the optimal cutting scheme. Press rolls 24 ensures workpiece 12 remains in the same position as it was when it passed under scanner 8 as workpiece 12 is cut by saws 28 and 28*a*. Slewing assembly 80 initially locates the desired number of first and second saw blades 28 and 28*a*, respectively at their initial positions for the start of the cutting operation on the upcoming workpiece 12. This initial location includes both the location along arbors 30 and 30*a* and the spacing between each saw blades 28 and 28*a*, both controlled by slewing actuators 136. Also, the initial skewing angle for the first and second sets of saw blades 28 and 28*a* is set by the actuation of skewing cylinders 114 and 114*a*. As workpiece 12 passes through saw blades 28 and 28*a*, and assuming workpiece 12 includes heartwood deficiencies which requires specialized cutting, slewing assembly 80 and skewing assembly 78 will be actuated as needed.

Figure 13:
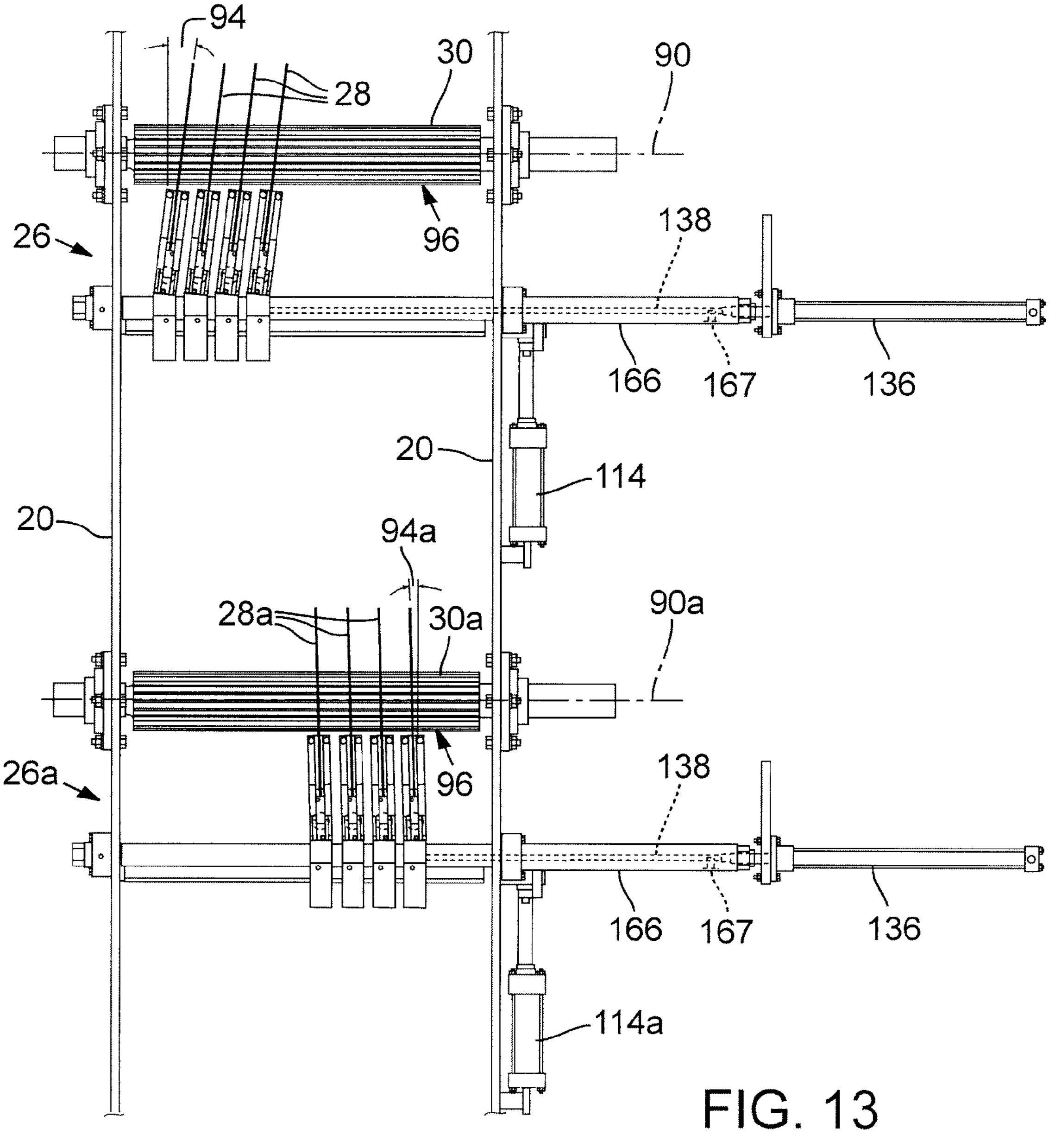
FIG. 13 illustrates a top view of the saw assembly of FIG. 3 showing a first set of four saw blade positioner assemblies and associated saw blades at a first location along the respective first arbor at a first set of skew angles together with a second set of four blade positioner assemblies and associated saw blades at a second location along the respective second arbor at a different set of skew angles in accordance with various embodiments of the present invention.
Figure 14A:
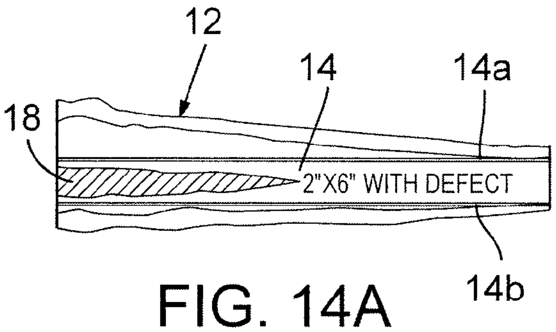
FIG. 14*a* through 14*e* illustrate plan views of flitches showing single board dimension only, single board defect avoidance, two board dimension only, two board defect avoidance and two board overlapping edge trimming solutions in accordance with various embodiments of the present invention.
Figure 14B:
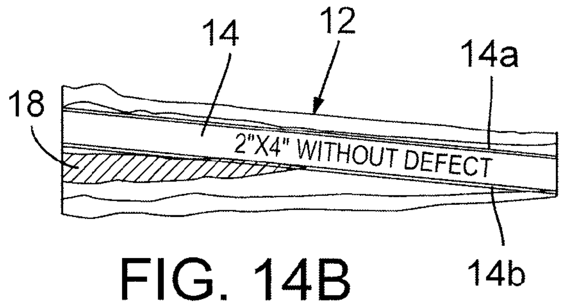
Figure 14C:
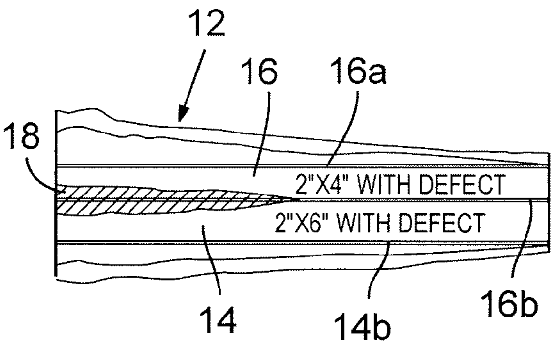
Figure 14D:
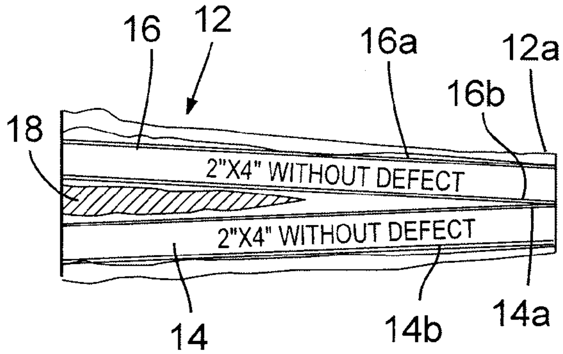
Figure 14E:
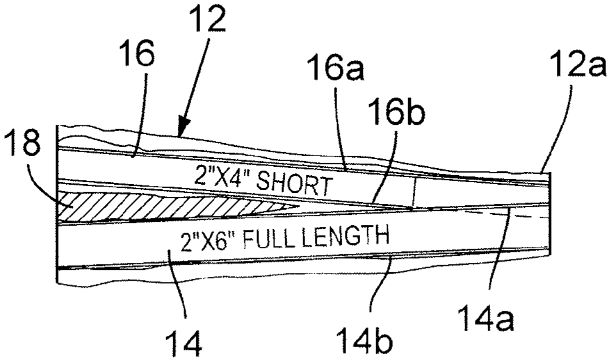
Figure 15:
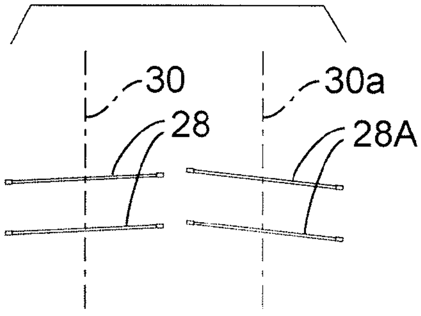
FIG. 15 illustrates a schematic representation of the saws on the first and second arbors having different skew angles from each other in accordance with various embodiments of the present invention.

As illustrated in FIGS. 3 and 13, first and second active sawguide assemblies 26 and 26*a* are mounted in parallel spaced apart relation to each other for example within a common saw box 20. It will be appreciated that separate sequential saw boxes may also be used. Linear actuators 136 position each saw 28 and 28*a* at an appropriate position as determined by an optimizing processor. First skewing cylinder 114 orients the first saws 28 to the desired skew angle 94 while the second skewing cylinder 114*a* orients the second saws 28*a* to the desired skew angle 94*a*. The linear actuators 136 and first and second skewing cylinders 114 and 114*a* may adjust the position and skew of the saws 28 and 28*a* during the cut as determined by the optimizing processor. As illustrated in FIG. 3, the first active sawguide assembly 26 may cut a first board 14 while avoiding the heartwood 18 and trimming the edges of a flitch 12. The second active sawguide assembly 26*a* may cut a second board 16 while avoiding the heartwood 18 and trimming the edge of the flitch 12. The linear spaced apart relationship of the first and second active sawguide assemblies 26 and 26*a* permits the cut lines 16*a* and 16*b* and 14*a* and 14*b* to intersect each other without requiring any of their corresponding saws 28 or 28*a* to be lifted out of interference with another saw. This arrangement therefore permits wider boards 14 and 16 to be cut and therefore permits greater recovery of the valuable sapwood.

As will be apparent to those skilled in the art in the light of the foregoing disclosure, many alterations and modifications are possible in the practice of this invention without departing from the spirit or scope thereof.

What is claimed is:

1. A wood processing machine adapted to cut a wood workpiece traveling in a process direction, comprising:

a first saw assembly positioned across a workpiece flow path, the first saw assembly having a first arbor disposed for rotational movement and one or more first saws coupled to the first arbor such that the first saws rotate with the arbor and move axially along the first arbor;

a second saw assembly disposed across the workpiece flow path and downstream from the first saw assembly in relation to the workpiece process direction, the second saw assembly having a second arbor disposed for rotational movement, one or more second saws coupled to the second arbor such that the second saws rotate with the second arbor and move axially along the second arbor; and a controller operatively coupled to the first and the second saw assembly, the controller configured to independently control movement of the first saw assembly and the second saw assembly so that the first at least one or more saws can follow a first optimized cutting path and the second at least one or more saws can follow a second optimized cutting path overlapping at least a portion of the first optimized cutting path as the work piece travels in the process direction, the first and second optimized cutting paths defining a first product and a second product to be cut from the workpiece.

2. The wood processing machine of claim 1, wherein the first saw assembly includes a first saw guide assembly disposed about the first at least one saw and configured to help actively control movement of the first at least one saw to follow the first optimized cutting path, the first saw guide assembly operatively coupled to the controller and further configured to skew the first at least one saw relative to the first saw arbor, and wherein the second saw assembly includes a second saw guide assembly disposed about the second at least one saw and configured to help actively control movement of the second at least one saw to follow the second optimized cutting path, the second saw guide assembly operatively coupled to the controller and further configured to skew the second at least one saw relative to the second saw arbor.

3. The wood processing machine of claim 2, wherein the first and second saw guide assemblies include a saw blade positioner coupled to a skewing assembly and/or a slewing assembly.

4. The wood processing machine of claim 3, wherein the saw blade positioner includes one or more guide arms configured to locate the saw blade along the arbor axis.

5. The wood processing machine of claim 4, wherein the skewing assembly includes a skewing cylinder and a skewing drive shaft coupled to the saw blade positioner, and wherein movement of the skewing cylinder and skewing drive shaft causes the guide arms to skew the at least one or more saws relative to at least one of the first and the second saw arbor.

6. The wood processing machine of claim 3, wherein the skewing assembly and blade positioner is configured to skew the at least one or more saw blades to a skewing angle of from 0 degrees to five degrees.

7. The wood processing machine of claim 3, wherein the slewing assembly includes a slewing actuator and a shift shaft coupled to the saw blade positioner and is configured to move the at least one saw blade along a surface of the arbor.

8. The wood processing machine of claim 7, wherein the shift shaft includes fluid channels that are coupled to the saw blade positioner and configured to transmit lubricating fluid to the blade positioner.

* * * * *